United States Patent [19]
Esbensen

[11] Patent Number: 5,226,141
[45] Date of Patent: Jul. 6, 1993

[54] VARIABLE CAPACITY CACHE MEMORY

[75] Inventor: Daniel M. Esbensen, Del Mar, Calif.

[73] Assignee: Touch Technologies, Inc., San Diego, Calif.

[21] Appl. No.: 794,689

[22] Filed: Nov. 18, 1991

Related U.S. Application Data

[63] Continuation of Ser. No. 380,629, Jul. 14, 1989, abandoned.

[51] Int. Cl.⁵ .................................................. G06F 12/00
[52] U.S. Cl. .............................. 395/425; 364/DIG. 1; 364/243.4; 364/243.41; 364/245.31; 364/245.1
[58] Field of Search ..................... 395/425, 275, 250

[56] References Cited

U.S. PATENT DOCUMENTS

| | | | |
|---|---|---|---|
| 4,258,418 | 3/1981 | Heath | 395/275 |
| 4,315,312 | 2/1982 | Schmidt | 364/200 |
| 4,445,170 | 4/1984 | Hughes et al. | 364/200 |
| 4,499,539 | 2/1985 | Vosacek | 364/200 |
| 4,524,416 | 6/1985 | Stanley et al. | 364/200 |
| 4,868,737 | 9/1989 | Soederlund | 364/200 |
| 4,947,319 | 8/1990 | Bozman | 364/200 |

*Primary Examiner*—Michael R. Fleming
*Assistant Examiner*—Debra A. Chun
*Attorney, Agent, or Firm*—Harness, Dickey & Pierce

[57] ABSTRACT

A variable length cache system keeps track of the amount of available space on an output device. The capacity of the cache system is continuously increased so long as it is less than the available output space on the output unit. Once the size of the cache system exceeds the available output space on the output unit, which is less than the total space available on the output unit by a predetermined amount, the contents of the cache memory are flushed or written to the output device and the size of the cache memory is reduced to zero.

35 Claims, 5 Drawing Sheets

VARIABLE CAPACITY CACHE MEMORY

This is a continuation of U.S. patent application Ser. No. 07/380,629 filed Jul. 14, 1989, now abandoned.

FIELD

This invention relates in general to methods for maximizing the efficiency of bulk data transfers from computer operating systems to peripheral devices, i.e., write operations, which store data serially such as tape devices, and particularly to such methods based on caching the write operations so they can be performed concurrently with other system operations, such as application program execution.

BACKGROUND OF THE INVENTION

The use of magnetic tape drives for bulk storage in computer systems is well known. While useful, such devices have undesirable characteristics that must be minimized.

For purposes of this specification, the terms "tape device" and "tape devices" shall refer to and mean data storage devices which store and access data serially, whether in "streaming" fashion or "start/stop" fashion, on or in a storage media of finite known length, such as magnetic tape devices (e.g. reel-to-reel and cartridge types), optical disks configured as tape devices, helical scan drives, and the like; and the terms "concurrent" and "concurrently" in the context of describing the timing of events controlled by a computer operating system shall also mean the overlapping or time multiplexing of such events, such as multiple programs being executed by the operating system apparently simultaneously. For purposes of this specification, the term "write head" shall refer to and mean the instrument by which data is actually recorded upon a tape or tape-like storage medium. For example, magnetic tapes can be recorded with a magnetic write head and optical disks configured as tape devices can be recorded with an optical write head.

In a computer system, the operational speed that data can be read, processed, and then written to a tape device is normally limited by the speed of the tape device. Advances in the pertinent art have increased many fold the access speed of disk devices and the processing speed of computers. Unfortunately increases in tape device speed have not kept pace. With faster disk reads and processing, whole operations are bottlenecked by the speed of the tape devices.

It has been found that in prior art computer systems when data is to be written to a tape or tape-like storage medium, the input/output (I/O) operation requests made by an application program to the system involving the writing of data to the medium are sent as fast as possible by the operating system to the tape device controlling the medium. There is no attempt to regulate the rate at which such write requests are sent to the device driver. This causes the data and I/O requests to back up and wait in a queue to be written to tape. This queue at some point causes the operating system or application program to stop and wait for the completion of one or more of the queued operations. This creates a sort of traffic jam for the data and an irregular write request rate. When this happens, the tape starts and stops over and over. This start and stop process is an agonizingly slow operation since the tape has to decelerate, rewind to the place where it last wrote data before decelerating (since it cannot write data while decelerating or accelerating), and then accelerate again in order to write data at maximum speed. This start and stop process is expensive in terms of overall or elapsed time and therefore a costly process. In order to work at their peak throughput capacity, tape devices need a controlled flow, i.e., a steady flow of data and I/O requests to the tape sub-system.

In order to speed up the whole operation, the tape devices must be able to write data concurrently with the reading of disk data and the processing. For concurrency to occur, the data to be written must be put into a high-speed memory cache.

It has been known in the prior art to use cache memories with output devices, such as tape drives, in both conventional memory management systems as well as in virtual memory systems.

A problem occurs when the tape reaches an end-of-media indicator (typically a reflector on the tape itself used as an end-of-tape marker). At that point the cache must be flushed out or write to the media. If the cache contains more data than can fit on a length (e.g. 10 feet) of writable media beyond the end-of-tape marker (past-end-of-tape media), some of the data will be lost or the tape device will signal a fatal drive error. Therefore the current art limits the size of the tape I/O data cache to the amount of data that can be written onto the past-end-of-tape media. This has the effect of limiting the number of concurrent tape write operations, which in turn limits the speed of the whole system.

It would be desirable to be able to use a cache memory larger than such a system has heretofore been able to use, i.e., larger than the data capacity of the past-end-of-tape media. It would also be desirable to be able to detect a near end-of-tape condition sufficiently in advance of the conventional end-of-tape indicator to allow the system to flush all of the cached I/O requests before the end of the writable portion of the medium is passed. The net result would be more concurrency than heretofore available, which in turn speeds up the whole system.

SUMMARY OF THE INVENTION

In accordance with the invention, a method and an apparatus are provided for dynamically changing the storage capacity, or size, of a cache memory used in the transfer of data to an output device which has a predetermined maximum storage capacity. The apparatus utilizes a maximum storage parameter which has a value a predetermined amount less the actual maximum storage capacity of the output device.

The apparatus determines the presently available storage capacity of the output device. This corresponds to the maximum storage capacity parameter reduced by the amount of information previously stored on or written to the device. The current capacity of the cache memory is compared to the available storage capacity of the output device. If the current capacity of the cache memory exceeds the available storage capacity of the output device, as described above, the contents of the cache memory are transferred to the output device.

If however the currently available storage capacity of the output device exceeds the current capacity of the cache memory, the apparatus increases the capacity of the cache memory by an amount corresponding to the next received block or file of information to be written to the output device. That information is then stored in the cache memory and the process is repeated.

The cache memory could be implemented as a contiguous group of memory locations which are located either in or coupled to a central processor or which can be separately located in a displaced cabinet. Alternately, the cache memory can be implemented as a group of pages in a virtual memory management system. In this implementation, the size of the cache memory is limited only by the available pages which can be acquired via the virtual memory management system.

Hence, in accordance with the virtual memory implementation, the practical size of the cache memory is limited only by the amount of space still available for storage on the output device. The output device can be any form of bulk storage medium such as magnetic tape drive or optical storage device.

The present method includes the steps of calculating the amount of output medium necessary to store the current contents of the cache memory. This value is added to the amount of the output medium which has previously been used. The sum can then be compared to the maximum storage parameter.

If the sum exceeds the maximum storage parameter the contents of the cache memory are immediately flushed or written to the output device. If the sum is less than the maximum storage parameter then the size of the cache memory can be increased by the size of the block or file of data which is to be next written into the cache memory. The comparison process is then repeated.

In accordance with the present apparatus and method, the size of the cache memory can be increased to a maximum corresponding to the maximum output storage parameter before the contents of the cache memory are flushed or written to the output device.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE PREFERRED EMBODIMENT

It is typical in computer systems to use special operating system routines to perform the actual communication between the computer and peripheral devices. The special routines are commonly called device drivers. These routines are device dependent and do the actual I/O operations. These routines are typically called as macros and they are called in response to an I/O request.

Figure 1:
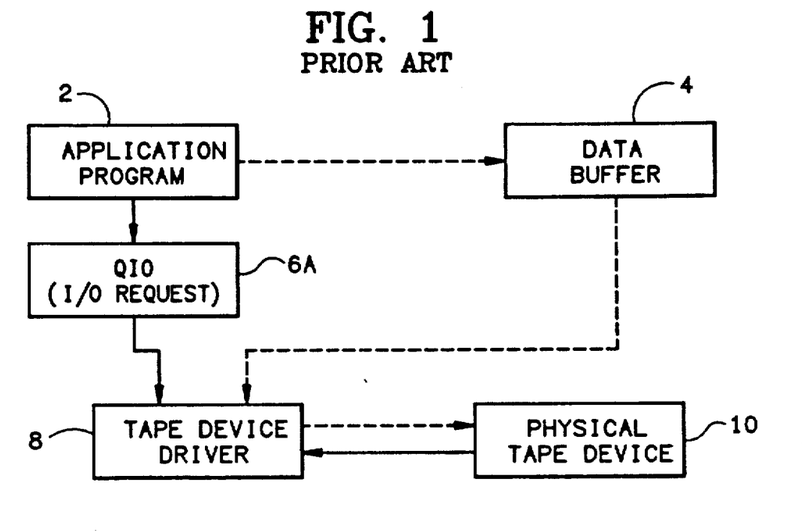
FIG. 1 is a block diagram representation of a portion of prior art computer system.

Referring to FIG. 1, when an application program 2 requires that data be stored on a tape device, it establishes the data to be written in a data buffer 4. It then initiates an I/O request by one or more special instructions 6A. Among other things the I/O request contains information concerning the type of operation being requested and a vector to the data buffer. In a prior art system without a tape I/O request caching system installed this I/O request is essentially passed on to a low level routine, the device driver 8, associated with the target tape device 10. The device driver communicates first-hand with the tape device to accomplish to write operation during which the device driver controls the flow of data between the data buffer 4 set up by the application program and the tape device.

Figure 2:
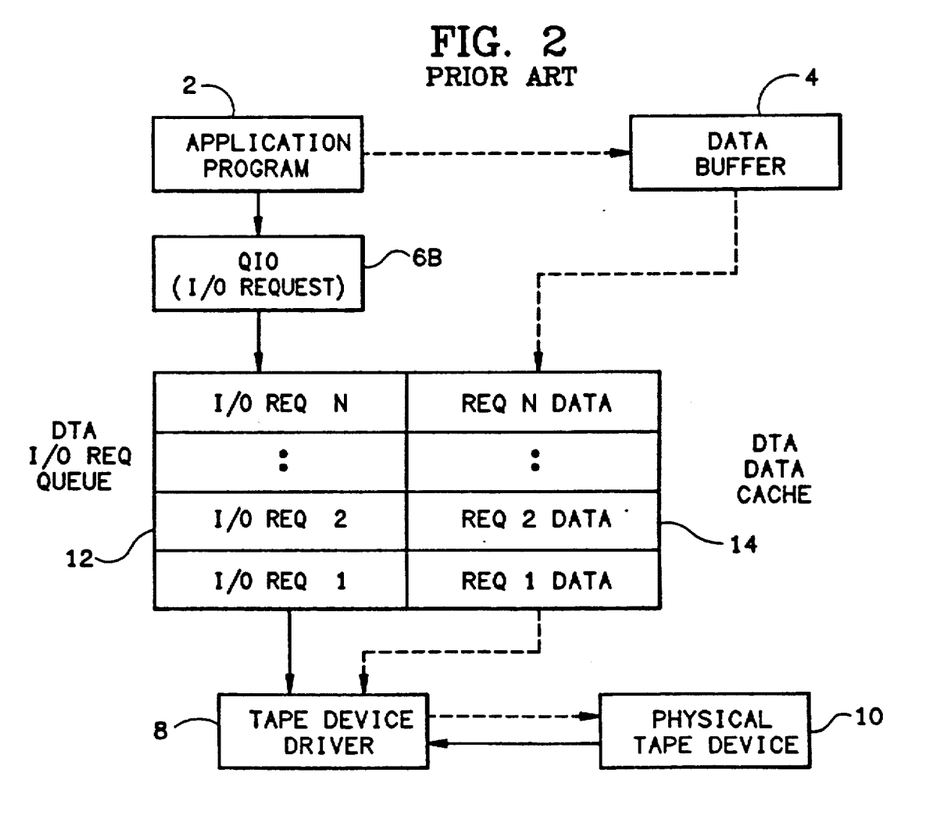
FIG. 2 is a block diagram representation of a portion of another prior art computer system.

Referring to FIG. 2, a tape I/O request a prior art caching system with a fixed length data cache is illustrated. In this system, the I/O request 6B initiated by the application program 2 is intercepted before it can pass to the device driver 8 and is placed in an I/O request queue 12. The data associated with the I/O request 6B is also moved to a data cache 14. From this point the I/O requests are sent to the device driver in an optimum regulated flow as determined by an algorithm. However, as previously explained with respect to other known prior art systems, the size of the cache is limited to the amount of data that can be written past the end-of-media indicator. In a virtual memory system, a fixed length cache can be implemented using "pages" of memory assigned by the system program.

The present invention provides a variable size cache memory based on the amount of available space remaining on the storage unit, such as the tape drive 10. With respect to a tape storage unit, the steps of the present invention include: (a) monitoring by means of a first algorithm the physical position, within a tolerance, of the tape device's writing head relative to an end of the tape device's storage media; (b) monitoring by means of a second algorithm the length of the tape device's storage media that will be consumed when all of the currently cached data is written to that media; and (c) whenever the length determined by the second algorithm plus the position of the tape device+ writing head relative to a starting end of the media is greater than or equal to the total available writable length of the media, then stopping the caching of tape device I/O operations and flushing or writing the current contents of the cache memory to the tape device.

Figure 3:
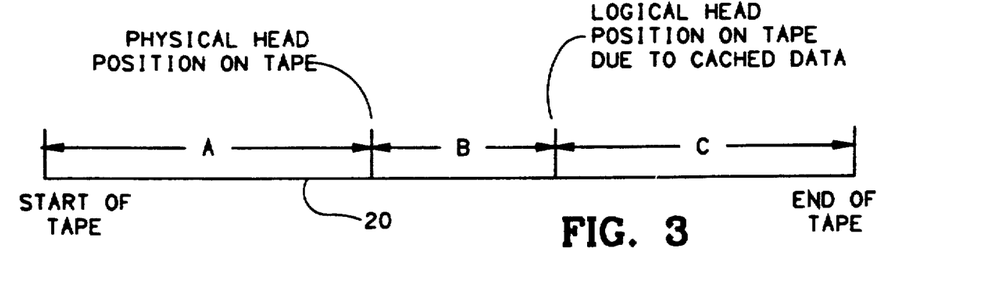
FIG. 3 is a schematic diagram illustrating portions of a magnetic tape.

Referring to FIG. 3, a tape or tape-like storage medium 20 as illustrated has data being recorded upon it serially in a direction from left to right, i.e., from the end designated "START OF TAPE" to the opposite end which is designated "END OF TAPE," by means of a writing head. The portion of the medium designated by "A" has already been consumed, i.e., data has actually been recorded upon it. This already-consumed portion extends from the start of the medium to the current physical position of the medium's writing head which is designated "HEAD." The portion of the medium designated by "B" is a portion that has logically been consumed, i.e., it is a portion that will become actually-consumed when all of the data currently in the cache has been flushed from the cache to be written on the medium, i.e., recorded upon the medium. The portion designated by "C" is that portion of the medium not yet logically or actually consumed. The location of the border between the "B" and "C" portions is the logical position of the writing head as opposed to the physical position, the physical position being located at the border between the "A" and "B" portions.

The physical and logical positions of the writing head can be determined by considering the following fixed and known factors: (a) the writable length of the medium, (b) the density at which the data is written onto the medium, and (c) the size of any inter-record gaps. Although the units of measurement and data can vary without departing from the scope of this invention, for illustrative purposes only it will be assumed hereinafter that the units of length are inches and the units of data are bytes.

The first algorithm determines at selected times the current physical position of the writing head in relation to the front of the tape by: (a) keeping a current total of all data units (bytes) already written to the medium, (b) dividing that total by the data density (bytes/inch), (c) adding to the result of the division the total length (in inches) of all inter-record gaps associated with the already written data. The result is the physical position, within an acceptable tolerance, of the writing instrument from the front of the medium in terms of length units (inches).

The second algorithm determines at selected times the current logical position of the writing head in relation to the front of the tape by: (a) keeping a current total of all cached write data units (bytes), i.e., data slated to be written to the medium, (b) dividing that total by the data density (bytes/inch), (c) adding to the result of the division the total length (in inches) of all inter-record gaps which will be associated with said cached write data, and further adding to that total the physical position of the writing head. The result is the logical position, within an acceptable tolerance, of the writing instrument from the front of the medium in terms of length units (inches).

The length of the past-end-of-tape media determines the range of acceptable tolerances. It has been found that industry standards for such media provide more than enough excess writable media beyond the end-of-tape reflector to compensate for any differences in the calculated from the real or actual positions. It has been found that these algorithms mathematically predict at any time both the physical and logical positions within 2% of actual for conventional tape devices.

Whenever the caching system recognizes that the currently queued I/O requests will bring the tape device's writing instrument to within a selected proximity of the end of the storage media, the caching system discontinues the queuing of I/O requests until this condition is no longer true. Preferably the selected proximity is approximately 150 feet for tapes having a total length of 2400 feet. Thus according to the method of this invention, when the logical position of the writing head is within 150 of the end of the tape, caching of I/O requests and data is stopped and the cache is flushed in its normal course. Thereafter the I/O requests are directed to the system device driver. The net effect is that for 95% of the tape the I/O operations are accelerated. But for the 5% immediately preceding the end of tape, the system functions as in the prior art shown in FIG. 1.

Hence, the size of the data cache can automatically increase to expand and encompass the entire available space on the medium to which information or data can be written. For example, if the medium is empty, the cache size could expand to almost the entire capacity of the medium.

Another way of expressing the steps of the present method is as follows. The following factors are utilized in determining when to write the current cache contents to tape;

1) number of inches of tape on the reel (total inches);

2) number of inches of tape already consumed (already consumed);

3) density that data will be written at (bytes per inch density);

4) inter-record-gap size (irg inches).

The apparatus calculates the number of inches of tape that would be consumed if the data in the variable length cache memory is written to the tape drive by:

```
consumed = [data size in bytes]/[bytes per inch
density] + [irg size]
if [already consumed] + consumed > = [total inches]
then
begin
flush the contents of the current cache out to tape
stop data caching
end
[already consumed] = [already consumed] + consumed
```

Using this method, the size of cache is dynamically alterable and is no longer limited to the amount of data that can be written past the end-of-tape reflector. Instead, the cache is limited only by:

1) amount of data that can still be written to the tape and 2) memory caching resources It will be understood that the present apparatus and method could be implemented in a variety of different ways without departing from the spirit and scope of the present invention. For example, the method could be implemented using a stored program computer. In this instance, a dynamic cache manager can be provided in the form of a program. Alternately, the apparatus could be implemented as a hardwired system instead of a programmed system. It could be implemented with a dedicated cache management microprocessor with the management program stored in ROM.

It will also be understood that the apparatus and method of the present invention are usable with a wide variety of different types of computer systems. For example, the dynamically adjustable cache memory of the present invention can be used in conjunction with a relatively standard memory management system. However, beyond that, the apparatus and method of the present invention could be used very advantageously in a virtual memory management system.

When the apparatus and method of the present invention are used in conjunction with a virtual memory management system, that portion of the virtual memory management system which deals with input/output operations could communicate with a dynamic cache manager program. The cache management program could take in as inputs the length or total number of inches of tape on a reel, the density in bytes per inch at which data will be recorded as well as the inter-record-gap size.

The dynamic cache management program in a virtually memory system could use, to implement the variable size cache memory, one or more "pages" of memory taken off of the virtual memory system free page list. The number of memory pages taken from the free page list in this instance is dynamically controlled.

Hence, the cache memory itself is implemented as a plurality of one or more pages from the virtual memory system. As is well known, such pages could be implemented on disk drives. In such an instance, as is standard for virtual memory systems, a page of information recorded on a disc drive is brought into computer memory as needed. Hence, the cache memory itself could be partly resident in main computer memory and partly resident on one or more disc drives depending on the assignments made by the virtual memory management system. Thus, as a practical matter, the cache memory can be made as large as necessary within the limits of the virtual memory management system.

Figure 4:
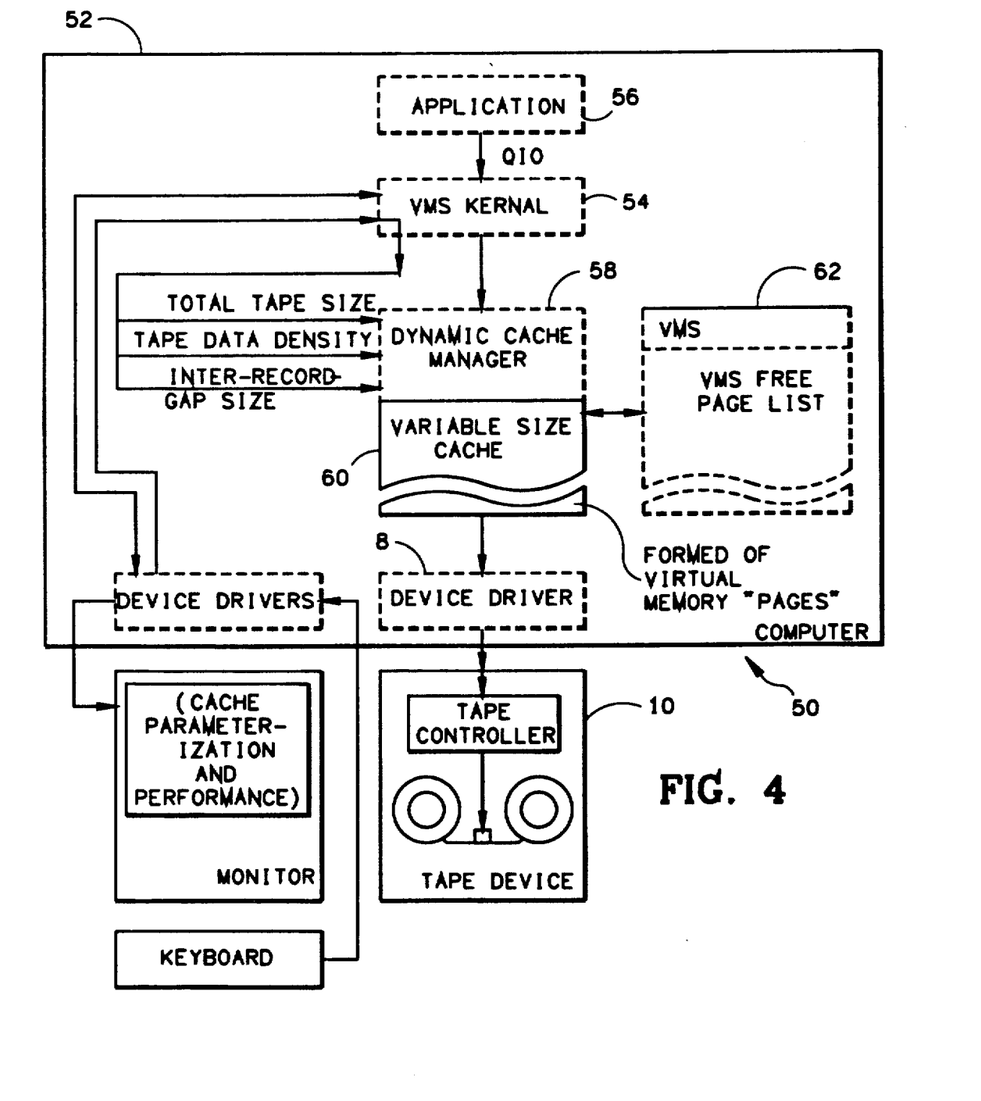
FIG. 4 is a block diagram representation of a computer system in accordance with the present invention.

FIG. 4 illustrates an overall block diagram of a virtual memory type system 50 which incorporates a dynamically variable cache memory in accordance with the present invention. The system 50 includes a computer 52 which is being controlled in part by a control program which includes a virtual memory management system kernel 54. The kernel 54 receives input/output requests from application programs 56 which are being executed.

The kernel 54 communicates with a dynamic cache management program 58 which could be resident for execution purposes in the main memory of the computer 52. The dynamic cache management program receives as parameters, information pertaining to the length of the media magnetic tape, which is available, the tape write density as well as the inter-record gaps.

Utilizing the above described method steps, the dynamic cache management program 58 adjusts the size of a variable length cache memory 60. In accordance with the present method, when the amount of information currently in the cache 60, plus the amount of information previously written to the tape drive 10 exceeds the total available space then the current contents of the cache 60 are written to the tape drive 10. Where, as in the system 50 of FIG. 4, the cache 60 is implemented utilizing one or more pages provided by the virtual memory management system, indicated generally at 62, then the size of the cache 60 can become arbitrarily large and far exceed the size of the main memory of the computer 52.

If the prior sum does not exceed the available space on the tape on the drive 10, then the size of the cache 60 can be increased when the next file or block of information is received to be written to the tape drive. The size of the cache 60 can thus be continuously increased so long as there is space on the physical reel of tape.

Figure 5:
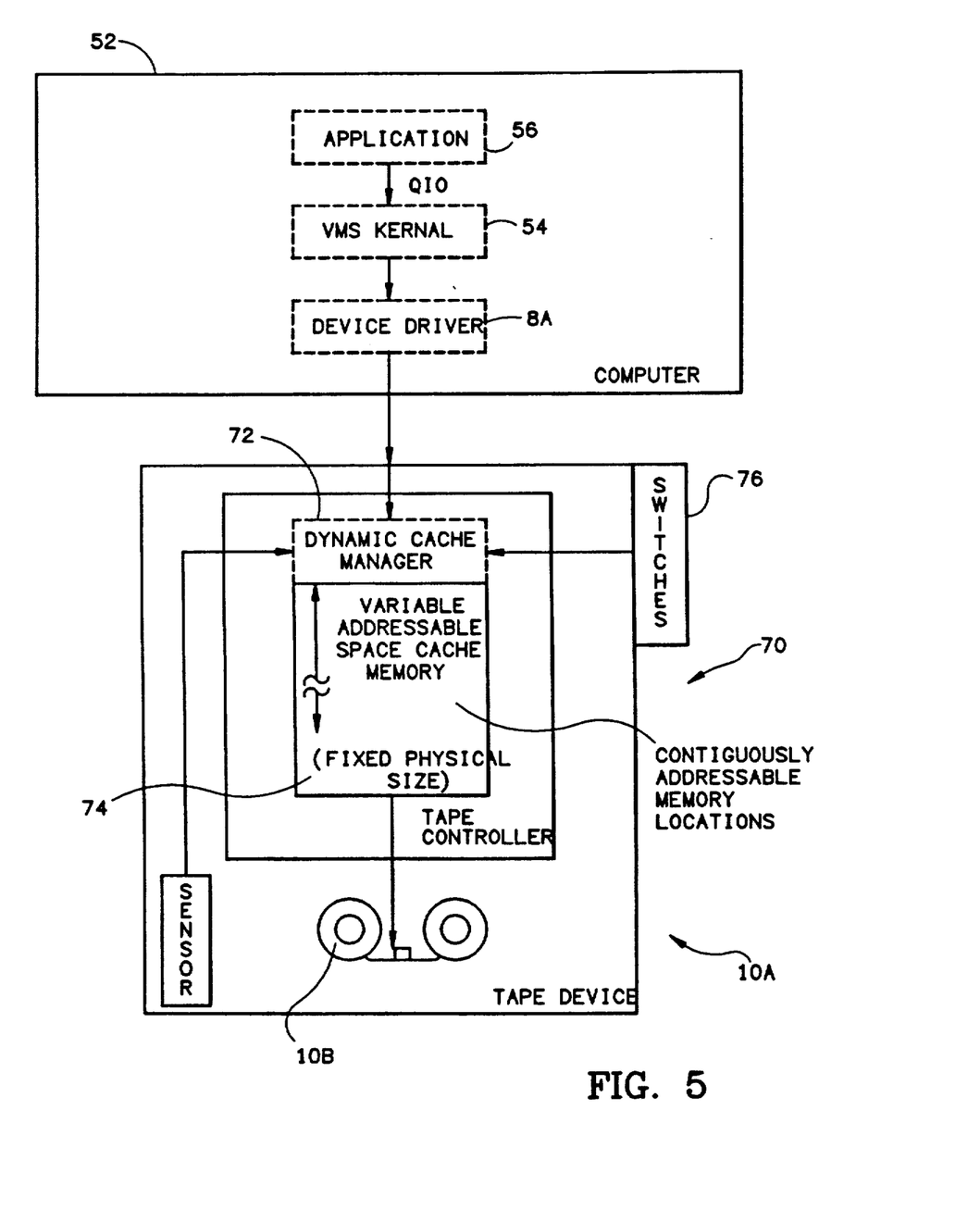
FIG. 5 is a block diagram representation of a computer system in accordance with the present invention with a second embodiment of the present invention.

FIG. 5 illustrates an alternate system 70 which embodies the present invention. In the system 70, the device driver 8a does not communicate directly with the tape unit 10a. Instead, the tape unit 10a includes a dynamic cache management program 72 in combination with a memory 74 of the fixed maximum size.

It will be understood that the dynamic cache management program 72 could be executed by a microprocessor contained within the system 10a. The variable cache management program 72 can be used to store information into the cache memory 74 so long as the amount of information stored therein is less than or equal to the available space on the physical tape drive using the methods described previously. When the contents of the cache memory 74 correspond to the available space on the magnetic tape on the drive 10b the contents of the memory 74 are flushed or written to the tape drive 10b.

Input concerning the write density as well as the total capacity or length of the tape available on the drive 10b can be provided via manually setable switches 76.

Figure 6:
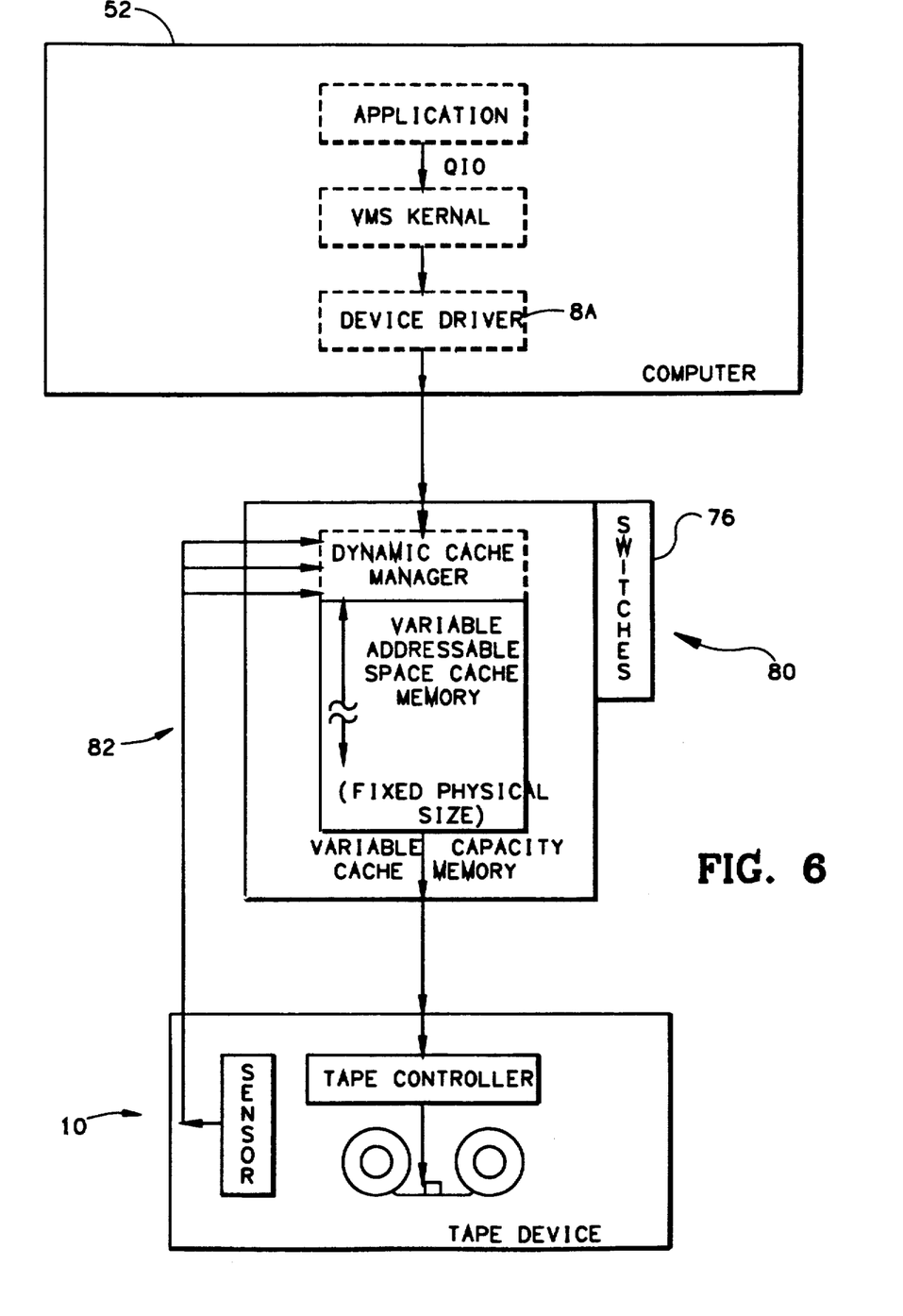
FIG. 6 is a block diagram representation of a computer system in accordance with the present invention with a third embodiment of the present invention.

Yet another embodiment of the present invention is illustrated by the system 80 of FIG. 6. In the system 80, a variable capacity cache memory unit 82 is provided which is coupled between the computer 52 and the tape drive 10. In the embodiment of FIG. 6, the cache memory unit can be implemented as a unit which is separate from, although coupled to the tape drive 10.

Figure 7:
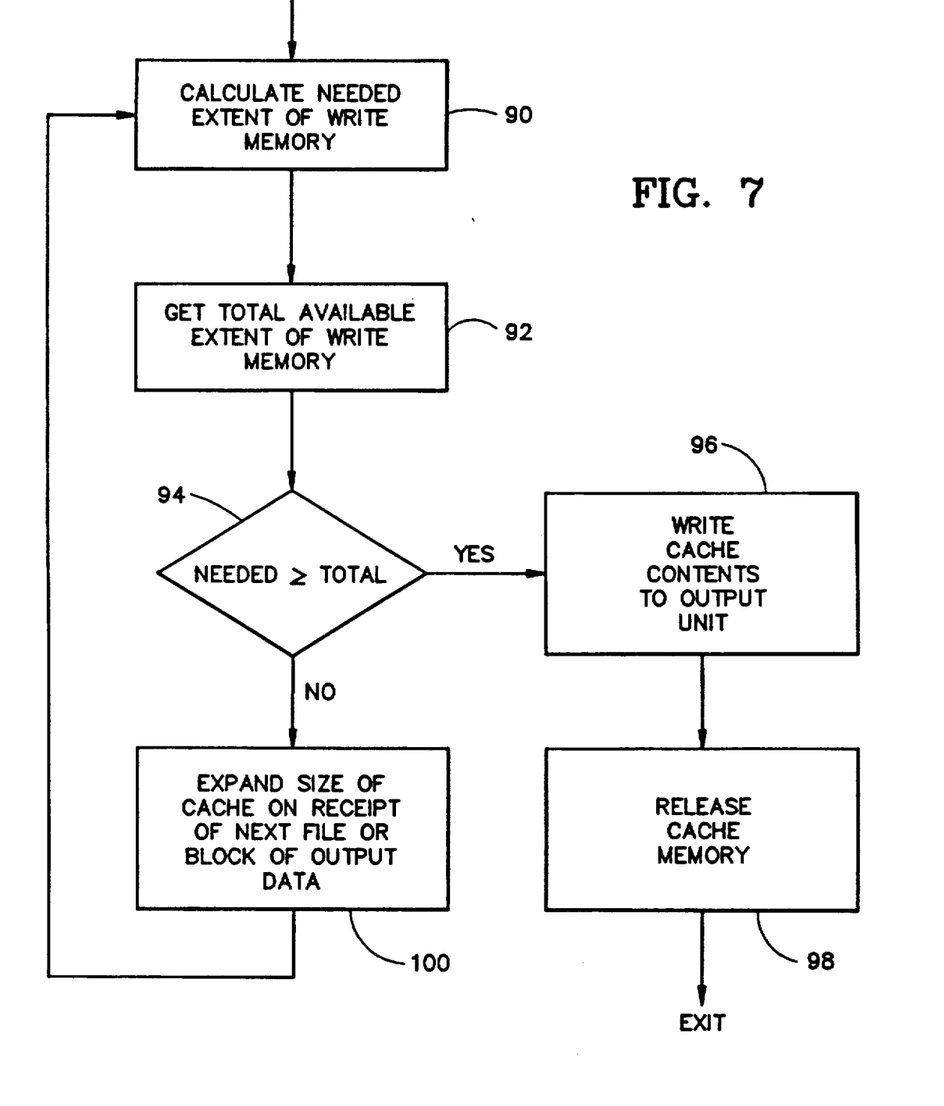
FIG. 7 is an overall block diagram illustrating steps of a method in accordance with the present invention.

FIG. 7 illustrates an overall block diagram of the method of the present invention. After each block of information, corresponding to some number of bytes, is written into the cache memory, a calculation is made in a step 90, as previously discussed, to determine the needed extent of the write memory based on the contents of the cache memory and the number of bytes previously written to the tape. The total available extent of write memory is retrieved in a step 92.

The needed extent of write memory is compared to the total available extent of write memory in a step 94. If the needed extent of write memory exceeds the total available extent of write memory, in a step 96, the contents of the cache memory are written to the physical tape. In a step 98, the cache memory is released if need be, such as if the cache memory were implemented using pages in a virtual memory system. Once the physical tape is full, then it would then be necessary to reload the tape unit with a fresh reel of tape to continue writing to that particular drive.

Again with reference to the step 94, if the needed extent of write memory does not exceed the available extent of write memory on the tape unit, the size of the cache memory can be expanded to receive the next vial or block of information to be written to the tape drive.

Attached hereto is a computer program module named "TATHROTTLE" which carries out the calculations for dynamic cache management as previously described and illustrated in FIG. 7.

A particular type of virtual memory system which can advantageously use the present invention is represented by the family of VAX-type virtual memory computer systems marketed by the digital equipment corporation.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. An apparatus for dynamically changing the storage capacity of a cache memory used in the transfer of data to an output device having a predetermined maximum storage capacity, the apparatus comprising:
   means for determining an available storage capacity parameter as a parameter of how much of the predetermined maximum storage capacity of the output device is available for accepting data, said maximum storage capacity being less than an actual storage capacity of the output device;
   means for comparing a current capacity of data stored in the cache memory to the available storage parameter;
   means for enabling the current capacity of the data in the cache memory to increase if the storage parameter exceeds the current capacity of the cache memory; and means for transferring the data stored in the cache memory to the output device if the current capacity of the data in the cache memory exceeds the storage capacity parameter.

2. An apparatus as in claim 1 including virtual memory storage means for increasing the storage capacity of the cache memory by providing additional data storage space when the capacity of the cache memory reaches a predetermined value because of the storage capacity of the cache memory being increased.

3. An apparatus as in claim 1 including capacity increasing storage means for increasing the data storage capacity of the cache memory, said storage means being linkable to said cache memory be a data transfer link.

4. An apparatus as in claim 1 including a cache memory formed of a plurality of sequentially addressable memory locations.

5. A method of dynamically changing the storage capacity of a cache memory used in the transfer of data to an output device having a predetermined maximum storage capacity comprising:

determining an available storage capacity parameter as a parameter of how much of the predetermined maximum storage capacity of the output device is available for accepting data, said maximum storage capacity being less than an actual storage capacity of the output device;

comparing a current capacity of data stored in the cache memory to the available storage parameter;

enabling the current capacity of the data in the cache memory to increase if the storage parameter exceeds the current capacity of the cache memory; and transferring the data stored in the cache memory to the output device if the current capacity of the data in the cache memory exceeds the storage capacity parameter.

6. A method as in claim 5 including:

providing virtual memory storage by adding additional storage space to the cache memory storage capacity when the capacity of the cache memory reaches a predetermined value because of the storage capacity of the cache memory being increased.

7. A method as in claim 5 including determining the quantity of information that had previously been transferred to the output device; and adding the current capacity of the cache memory to the determined quantity.

8. A method as in claim 7 wherein the step of increasing the storage capacity of the cache memory includes increasing the capacity of the cache memory if the sum of the current storage capacity of the cache memory plus the determined quantity is a predetermined amount of data less than the maximum storage capacity of the output device.

9. A cache memory system with a dynamically adjustable capacity and usable to transfer information to an output device having an effective predetermined maximum storage capacity, said maximum storage capacity being less than an actual storage capacity of the output device, the cache memory system comprising:

means for determining an amount of information previously transferred to the output device from the cache memory system;

means for forming a sum of said previous amount of transferred information and a preset capacity of information stored in the cache memory system;

means for comparing said maximum storage capacity of the output device to said sum and for generating a signal in response to said maximum storage capacity exceeding said sum; and means responsive to said signal for increasing the storage capacity of the cache memory system for accepting information.

10. A cache memory system as in claim 9 with said increasing means including:

means for providing one or more groups of storage locations for increasing the storage capacity of the cache memory system, said storage locations being linkable to said cache memory system by a data transfer link.

11. A cache memory system as in claim 10 with said providing means including at least a portion of a virtual memory management system.

12. A cache memory system as in claim 10 wherein said providing means includes additional storage capacity for increasing the storage capacity of the cache memory system, the additional storage capacity being linkable to said cache memory system by a data transfer link.

13. A cache memory as in claim 10 with said providing means including solid state memory means contiguously addressable with said cache memory.

14. A cache memory system as in claim 9 with said output device including a linearly moveable storage medium.

15. A cache memory as in claim 16 with said storage medium including a magnetic tape.

16. A cache memory system as in claim 9 including virtual memory storage means with said increasing means including means for allocating additional storage units from said virtual storage means to increase said cache memory storage capacity.

17. A cache memory system as in claim 9 including means, responsive to an absence of said signal for transferring the contents of said cache memory system to the output device.

18. A cache memory system as in claim 17 including means, responsive to said transferring means, for reducing said capacity of said cache memory.

19. A method of operating a cache memory system with a dynamically adjustable capacity and usable to transfer information to an output device having a predetermined nominal maximum storage capacity, which is a selected amount less than the actual maximum storage capacity, the method comprising:

providing a cache memory;

determining an amount of information previously transferred to the output device from the cache memory;

forming a sum of the previous amount of transferred information and a present capacity of information stored in the cache memory;

comparing the nominal maximum storage capacity of the output device to the sum and generating a signal in response to the nominal maximum storage capacity exceeding said sum; and increasing the storage capacity of the cache memory in response to the presence of the signal.

20. A method as in claim 19 including:

providing one or more groups of storage locations for increasing the storage of the cache memory, said storage locations being linkable to the cache memory by a data transfer link.

21. A method as in claim 20 wherein providing one or more storage locations includes providing a virtual memory management system for managing data in the storage locations.

22. A method as in claim 19 including providing virtual memory storage means and allocating additional storage units from the virtual storage means to increase cache memory storage capacity.

23. A method as in claim 19 including transferring the contents of the cache memory to the output device in response to an absence of said signal.

24. A method as in claim 23 including reducing the capacity of the cache memory in response to the transferring step.

25. A method as in claim 24 including reducing the current capacity of the cache memory to zero after the transferring step.

26. In a computer system having a computer writing data through a data cache to a data storage medium of finite size, the data cache comprising:
    means for determining a remaining, unwritten, storage capacity of the finite size data storage medium; and
    means for increasing the storage capacity of the data cache in response to blocks of data being sent through the data cache from the computer, wherein the data cache is increased up to an amount of information which is capable of being stored in the determined remaining capacity of the data storage medium.

27. The computer system according to claim 26 wherein the data storage medium is written serially from a beginning to an end, and wherein the means for determining comprises:
    means for calculating the capacity of the serially written data storage medium that remains before its end.

28. The computer system according to claim 27 wherein the serially written data storage medium is magnetic tape having an end-of-tape marker before its end, and wherein the means for calculating comprises:
    means for computing the cumulative number of inches of magnetic tape required to write all of the data both previously written from the cache, and currently held within the cache, to the magnetic tape; and wherein the means for increasing comprises:
    means for comparing the computed number of inches of magnetic tape which stores information previously sent from the cache or which will store information currently held in the cache to the total number of inches of magnetic tape remaining before the end-of-tape marker to determine if the information stored in the cache will fit on the tape.

29. An improved method of writing data from a computer through a data cache to a data storage medium of finite size, the improved data caching method comprising:
    determining a remaining data storage capacity of the finite size data storage medium; and
    increasing the storage capacity of the data cache in response to blocks of data being sent through the data cache from the computer, wherein the data cache is increased up to an amount of information which is capable of being stored in the determined remaining capacity of the data storage medium.

30. The data cache method according to claim 29 wherein the writing is serial from a beginning to an end of a data storage medium, and wherein the determining comprises:
    calculating the capacity of the serially written data storage medium that remains before it send.

31. The data caching method according to claim 30 wherein the serial writing of a data storage medium is of magnetic tape having an end-of-tape marker before its end, and wherein the step of calculating comprises:
    computing the cumulative number of inches of magnetic tape required to write all data previously and currently within the cache to the magnetic tape; and wherein the increasing step includes:
    comparing the computed number of inches of magnetic tape which stores information or which will store information from the cache to the total number of inches of magnetic tape remaining before the end-of-tape marker to determine if the information stored in the cache will fit on the tape.

32. A data cache for buffering data to be stored between a data origination means for originating the data and a data storage means, having a finite data storage capacity, for storing the data, the data cache comprising:
    an addressable memory means for holding the data to be stored intermediary in its transfer from the origination means to the data storage means;
    means for increasing the addressable space of the addressable memory means as the addressable memory means accepts data from the origination means in accordance with the availability of the data storage capacity of the data storage means.

33. The data cache according to claim 32 wherein the addressable memory means comprises:
    a buffer memory having a physically addressable space that is less than the data storage capacity of the data storage means; and
    means for determining a remaining data storage capacity of the data storage means.

34. A method of buffering data to be stored from a data origination means for originating the data and a data storage means, having a finite data storage capacity, for storing the data, the data buffering method comprising:
    holding the data to be stored in an addressable memory intermediary in its transfer from the origination means to the data storage means; and
    increasing the addressable space of the addressable memory as the addressable memory accepts data from the origination means in accordance with the availability of the data storage capacity of the data storage means.

35. The data caching method according to claim 34 wherein the holding is in a buffer memory having a physically addressable space that is less than the data storage capacity of the data storage means; and wherein the step of increasing comprises:
    determining a remaining data storage capacity of the data storage means.

* * * * *